United States Patent Office 3,136,752
Patented June 9, 1964

3,136,752
AMINOPYRAZOLE MONOAZO DYESTUFFS
Jean-Pierre Jung, Riehen, near Basel, and Meinrad Hürbin, Basel, Switzerland, assignors to J. R. Geigy A.-G., Basel, Switzerland
No Drawing. Filed Aug. 3, 1962, Ser. No. 214,517
Claims priority, application Switzerland Oct. 23, 1957
8 Claims. (Cl. 260—162)

The present application is a continuation-in-part of applications Serial No. 765,281, filed Ocober 6, 1958 (allowed, and forfeited after the filing of the present application) and Serial No. 12,293, filed March 2, 1960 (abandoned since the filing of the present application).

The invention concerns monoazo dyestuffs suitable for the dyeing of natural or synthetic polypeptide fibres, processes for the production thereof, their use for the dyeing of polypeptide fibres and in particular of wool, and, as industrial product, the material fast dyed with the aid of these dyestuffs.

In the series of water soluble, yellow wool dyestuffs from aryl diazo compounds and 1-aryl-5-pyrazolones, products which have absolutely insufficient fastness to alkali and milling and, therefore, which are technically unusable, are obtained if the diazo component contains a non-ionogenic, electron attracting substituent in the ortho- and/or para-position to the azo linkage.

It has now been found that new, valuable, monoazo dyestuffs which are fast to alkali and very fast to light of the Formula I

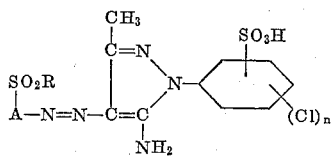

wherein
R represents either lower alkyl or benzyl, mono or bicyclic aryl, mono- or bicyclic aryloxy,

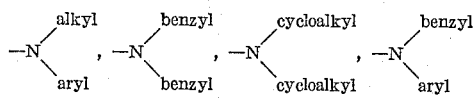

piperidino and morpholino, the —N-aryl substituent being mono- or bicyclic, and wherein
A is a benzene ring which may be further substituted with a phenoxy group when the —SO₂R group is in 4-position to the azo bridge, or with a chloroacetylamino or a phenoxy group, when the —SO₂R group is in 2-position to the azo bridge, and
n is one of the numerals 0 to 2 inclusive, are obtained, if the corresponding diazotised 2- or 4-aminobenzene-1-sulphonyl compound is coupled with a compound of Formula II

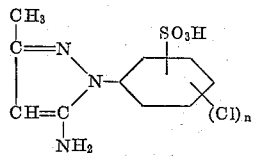

wherein n has the meaning given above.

The radical R can be, for example, a lower alkyl group, e.g. methyl, ethyl, propyl, a benzyl or an at most bicyclic carbocyclic aryl group. Substituents which can be used in the ring, when R represents an at most bicyclic carbocyclic aryl or aryloxy radical or when in the above mentioned amine radical one of the substituents is an aryl radical, are halogens such as fluorine, chlorine, bromine, aliphatic groups such as methyl, ethyl, tert. butyl, tert. amyl, octyl, tetramethylene groups; ether groups such as methoxy, ethoxy, butoxy, phenoxy or phenylthio groups; acylamino groups such as acetyl, chloracetyl, β-bromopropionyl, dimethylacroyl, phenacetyl, phenoxyacetyl, carbomethoxy, carboethoxy, carbobutoxy, carbocyclohexyloxy, benzoyl, chlorobenzoylamino groups; triazinylamino groups, carboxyl groups, modified carboxyl groups such as carboxylic acid ester or carboxylic acid amide groups; sulphonic acid groups and modified sulphonic acid groups such as sulponic acid aryl ester and sulphonic acid amide groups; acylated sulphonic acid amide groups having an acyl radical derived from aliphatic or aromatic carboxylic or sulphonic acids; alkyl and aryl sulphonyl groups.

If R is an aryloxy radical, then it is derived chiefly from monohydroxy compounds of the benzene series, for example from phenol, alkylphenols such as o-, m- or p-cresol, 2.4-, 2.5- or 3.4-dimethylphenol, 4-tert. butyl or amyl phenol, 4.5-tetramethylene phenol, 4-phenyl or 4-cyclohexylphenol, mono- or dichlorophenol or acylaminophenol, it can also be derived however from monohydroxy compounds of the naphthalene series. If R is an organic amide radical then the nitrogen substituents can be of the aliphatic, cycloaliphatic, araliphatic, aromatic and, possibly, the heterocyclic series. For example methyl, ethyl, butyl cyclohexyl, benzyl radicals, and phenyl and naphthyl radicals substituted as outlined above can be used. The substituent —SO₂—R, when it means a sulphamide group, can be derived from primary and secondary organic amines as well as from saturated heterocyclic nitrogen bases such as piperidine or morpholine.

The diazo components are obtained for example from o- or p-nitrochlorobenzene compounds, by reacting with sulphinic acids to form the corresponding sulphones, or by reacting o-nitrobenzene sulphonic acid chlorides with phenolates or primary or secondary organic amines and then reducing the nitro group to the amino group. Depending on their composition and solubility, they are diazotised either in mineral acid solution with sodium nitrite, possibly in the presence of inert organic solubility promoters such as low alcohols or fatty acids, or in concentrated sulphuric acid solution with nitrosyl sulphuric acid.

The coupling components are obtained by methods known per se from the corresponding sulpho-phenyl hydrazines and cyanomethyl ketones. Preferred coupling components are the 1-(sulpho-phenyl)-3-methyl-5-aminopyrazoles obtained from cyanacetone and sulpho-phenyl hydrazines and they can contain one or two chloro atoms. Examples are: 1-(2'-, 3' or 4'-sulphophenyl)-, 1-(2'-chloro-5'-sulphophenyl)-, 1-(2', 5'-dichloro-4'-sulphophenyl)-, 1(3'-chloro-6'-sulphophenyl)-3-methyl-5-aminopyrazole.

The coupling is performed advantageously in an acid medium, for example in mineral acid to weakly acid aqueous solution, possibly while gradually buffering the mineral acid for example with alkali metal salts of lower fatty acids.

Those dyestuffs according to the present invention which contain, either bound at the aromatic radicals or substituents or in the organic radical of a sulphamide group, hydrocarbon radicals having at least 4 carbon atoms, advantageously saturated hydrocarbon radicals or also phenyl, alkylphenyl, or phenylalkyl radicals or also phenoxy radicals, homologues thereof, halogen phenoxy radicals or corresponding phenoxy alkyl, aryl or acyl-amino radicals, have increased affinity to wool and the wool dyeings thereof have excellent wet fastness properties. Examples are the tert. butyl and tert. amyl group, cyclohexyl, phenyl and phenoxy group in aromatic linkage and amide radicals containing saturated rings, for example sulphamide radicals containing cyclohexyl radicals, homologues thereof, hexahydrobenzyl radicals and tetra- or deca-hydronaphthyl radicals.

Those dyestuffs according to the present invention which contain, either bound at the aromatic radicals or substituents, or in the aryl radical of an N-aryl-substituted sulphamide group, exclusively methyl or ethyl or halogen as substituents, are particularly distinguished by their level dyeing and migration power.

The new dyestuffs are distinguished by very good fastness to light, perfect alkali fastness, good levelling power, very pure, generally greenish shades on wool and, when suitably substituted as outlined above, by very good drawing power onto wool even in a neutral to weakly acid bath and by very good wet fastness properties, in particular fastness to milling and seat water and good fastness to chlorine, of the wool dyeings. They can also be used for the dyeing of silk and of synthetic polyamide and polyurethane fibres. Their pure shade makes them valuable for combining with pure blue wool dyestuffs to attain green shades.

The following examples illustrate the invention. Where not otherwise stated, parts are given as parts by weight. The temperatures are in degrees centigrade. The relationship of parts by weight to parts by volume is as that of kilogrammes to litres.

*Example 1*

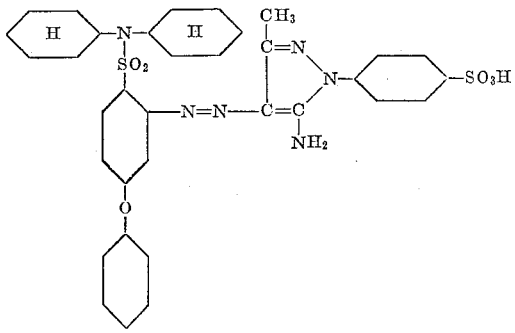

42.8 parts of 3-amino-1.1'-diphenylether-4-sulphonic acid dicyclohexylamide (M.P. 155°) are suspended in 180 parts of glacial acetic acid and dissolved by the dropwise addition of 25 parts of 30% hydrochloric acid. The solution is diazotised at 10–12° by the slow addition of 6.9 parts of sodium nitrite in 20 parts of water. The diazo solution is poured at 0–5° to an acetic acid solution of the sodium salt of 25.3 parts of 1-(4'-sulphophenyl)-3-methyl-5-aminopyrazole and 25 parts of crystallised sodium acetate in 600 parts of water. The whole is stirred for several hours at 0–10°, 100 parts of sodium chloride are added, the precipitated dyestuff is filtered off and dried.

In the presence of ammonium sulphate at a neutral to weakly acid reaction, it dyes wool in pure, very even yellow shades which are fast to wet and light. The bath is well exhausted.

*Example 2*

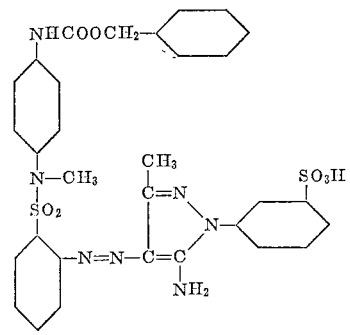

41.1 parts of 2-aminobenzene-1-sulphonic acid-N-methyl-N-(4'-carbobenzyloxyaminophenyl)-amide are dissolved cold in 150 parts of glacial acetic acid with 19 parts of concentrated sulphuric acid and the solution is diazotised at 10–15° while stirring well with the solution of 6.9 parts of sodium nitrite in 15 parts of water. 50 parts of ice are slowly added and then the yellowish diazo solution is poured into the solution of the sodium salt of 25.3 parts of 1-(3'-sulphophenyl)-3-methyl-5-amino-pyrazole and 25 parts of crystallised sodium acetate in 600 parts of water. The whole is stirred for several hours at 0–10°, the acid is then neutralised to some extent by sprinkling in 30 parts of sodium carbonate and the dyestuff is filtered off and dried. In the form of the dry sodium salt, it is a yellow powder which dissolves in hot water with a greenish yellow and in concentrated sulphuric acid with a yellow colour.

The dyestuff dyes wool from a bath containing 5% ammonium sulphate in level greenish yellow shades which have very good fastness to light.

*Example 3*

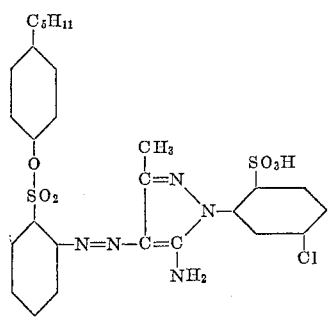

31.9 parts of 2-aminobenzene sulphonic acid-4'-amyl-phenyl ester are diazotised in 180 parts of glacial acetic acid and 25 parts of concentrated hydrochloric acid with 6.9 parts of sodium nitrite as described in Example 1. After diluting the diazo solution with water, it is gradually poured at 0–5° while stirring into the solution of the sodium salt of 28.75 parts of 1-(3'-chloro-6'-sulphophenyl)-3-methyl-5-aminopyrazole and 50 parts of crystallised sodium acetate in 800 parts of water. The monoazo dyestuff which forms immediately, precipitates as a yellow powder. The whole is stirred for several hours at 0–10°, then heated to 60°, the acid is neutralised to some extent by sprinkling in 50 parts of sodium carbonate and the yellow precipitate is filtered off under suction and dried. The dyestuff dissolves well in hot water with a yellow colour; in concentrated sulphuric acid it dissolves with an orange colour. On boiling in a liquor containing 5% of ammonium sulphate, it dyes wool in pure greenish yellow shades which are fast to light and alkali.

Example 4

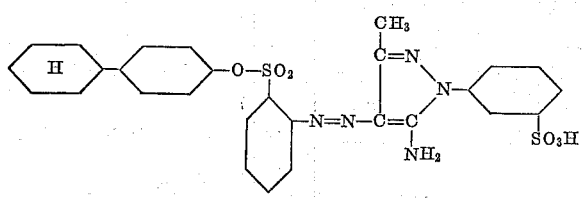

33.1 parts of 2-aminobenzene sulphonic acid-4'-cyclohexyl phenyl ester are diazotised as described in Example 1 and the diazo solution is coupled at 0–5° with the solution of the sodium salt of 25.3 parts of 1-(3-sulphophenyl)-3-methyl-5-aminopyrazole and 40 parts of crystallised sodium acetate in 500 parts of water. The monoazo dyestuff formed precipitates immediately as a yellow powder. The whole is stirred for several hours at 0–10°, the acid is neutralised to some extent by sprinkling in 50 parts of sodium carbonate and the dyestuff is filtered off under suction and dried. It is a yellow powder which dissolves in hot water with a yellow colour and in concentrated sulphuric acid with an orange colour. It dyes wool from a neutral to weakly acid bath in the presence of ammonium sulphate in pure greenish yellow shades which are fast to wet and light.

Example 5

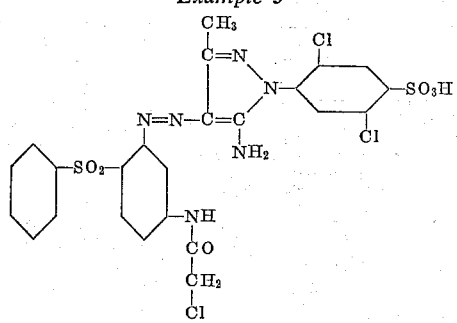

32.45 parts of 2-amino-4-chloracetylamino-1.1'-diphenyl sulphone in 150 parts of glacial acetic acid and 25 parts of concentrated hydrochloric acid are diazotised at 0–10° with 6.9 parts of sodium nitrite. After diluting the diazo solution with ice water, it is gradually poured while stirring at 0–5° to a solution of the sodium salt of 32.2 parts of 1-(2'.5'-dichloro-4'-sulphophenyl)-3-methyl-5-aminopyrazole and 50 parts of crystallised sodium acetate in 800 parts of water. The monoazo dyestuff which forms immediately, precipitates as a yellow powder. The whole is stirred for several hours at 0–10°, the acid is neutralised by sprinkling in 80 parts of sodium carbonate and the yellow precipitate is filtered off under suction and dried. The dyestuff dissolves well in hot water with a yellow colour. It dyes wool on boiling in a liquor containing 5% ammonium sulphate in pure greenish yellow shades which are fast to wet and light.

Example 6

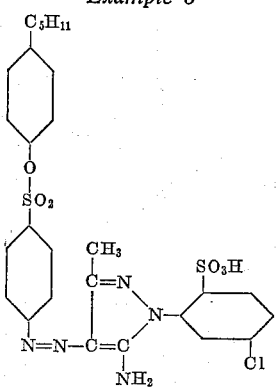

31.9 parts of 4-aminobenzene sulphonic acid-4'-amylphenyl ester in 180 parts of glacial acetic acid and 25 parts of concentrated hydrochloric acid, are diazotised as described in Example 1 with 6.9 parts of sodium nitrite. The diazo solution is diluted with ice water and then gradually poured at 0–5° while stirring into a solution of the sodium salt of 28.75 parts of 1-(3'-chloro-6'-sulphophenyl)-3-methyl-5-aminopyrazole and 50 parts of crystallised sodium acetate in 800 parts of water. The monoazo dyestuff which forms immediately, precipitates in the form of a yellow powder. The suspension is stirred for several hours at 0–10°, then heated to 60°, some of the acid is neutralised by sprinkling in 50 parts of sodium carbonate and the yellow precipitate is filtered off under suction and dried. The dyestuff dissolves easily in hot water with a yellow colour and it dissolves in concentrated sulphuric acid with an orange colour. On boiling in a bath containing 5% ammonium sulphate, it dyes wool in pure greenish-yellow shades which are fast to light and alkali.

Example 7

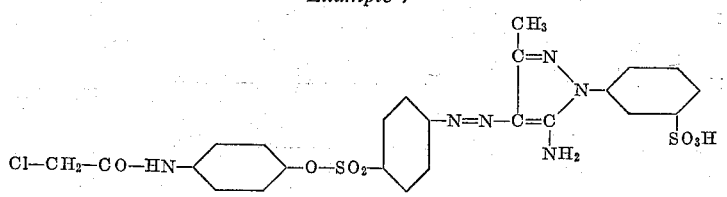

34.05 parts of 4-aminobenzene sulphonic acid-4'-chloracetylaminophenyl ester are diazotised as described in Example 1 and coupled at 0–5° with the solution of the sodium salt of 25.3 parts of 1-(3'-sulphophenyl)-3-methyl-5-aminopyrazole and 40 parts of crystallised sodium acetate in 500 parts of water. The monoazo dyestuff formed precipitates immediately in the form of a yellow powder. The suspension is stirred for several hours at 0–10°, some of the acid is neutralised by sprinkling in 50 parts of sodium carbonate and the dyestuff is filtered off under suction and dried. It is a yellow powder which dissolves in hot water with a yellow colour and in concentrated sulphuric acid with an orange colour. It dyes wool from a neutral to weakly acid bath in the presence of ammonium sulphate in pure greenish-yellow shades which are fast to light and wet.

Example 8

100 parts of previously well wetted wool are entered at 50° into a liquor which contains 1.5 parts of the greenish yellow dyestuff according to Example 2, 5 parts of ammonium sulphate and 5 parts of Glaubers salt in 3000 parts of water. The bath is brought to the boil within 10 minutes and kept for 45 minutes at boiling temperature. At the end of this time the dyestuff has been practically completely drawn onto the wool. A very level, very pure greenish yellow wool dyeing is obtained which is fast to wet and very fast to light.

Other monoazo dyestuffs according to the present invention which can be produced by the methods described in Examples 1 to 7 on using the corresponding amounts of diazo and azo components are given in the following table.

TABLE

| No. | Parts | Diazo component | Parts | Azo component | Shade of wool dyeing |
|---|---|---|---|---|---|
| 1 | 33.6 | 2-aminobenzene-1-sulphonic acid dicyclohexylamide. | 25.3 | 1-(4'-sulphophenyl)-3-methyl-5-amino-pyrazole. | Yellow. |
| 2 | 37.8 | 2-aminobenzene-1-sulphonic acid-(4'-carboamyloxyaminophenyl ester). | 25.3 | 1-(3'-sulphophenyl)-3-methyl-5-aminopyrazole. | Greenish yellow. |
| 3 | 39.0 | 2-aminobenzene-1-sulphonic acid-(4'-carbocyclohexyloxyaminophenyl ester). | 25.3 | do | Do. |
| 4 | 34.05 | 2-aminobenzene-1-sulphonic acid-(4'-chloracetylamino-phenyl ester). | 25.3 | do | Do. |
| 5 | 34.05 | do | 32.2 | 1-(2',5'-dichloro-4'-sulphophenyl)-3-methyl-5-amino-pyrazole. | Do. |
| 6 | 39.8 | 2-aminobenzene-1-sulphonic acid-(4'-carbobenzyloxy-aminophenyl ester). | 25.3 | 1-(4'-sulphophenyl)-3-methyl-5-aminopyrazole. | Do. |
| 7 | 38.9 | 2-aminobenzene-1-sulphonic acid-(2',4'-diamylphenyl ester). | 25.3 | do | Do. |
| 8 | 33.85 | 2-amino-5-chloracetylamino-4'-methyl-1,1'-diphenyl sulphone. | 25.3 | do | Yellow. |
| 9 | 35.35 | 2-aminobenzene-1-sulphonic acid-N-methyl-N-(4'-chloracetyl-aminophenyl)-amide. | 28.75 | 1-(3'-chloro-6'-sulphophenyl)-3-methyl-5-amino-pyrazole. | Do. Do. |
| 10 | 32.5 | 2-aminobenzene-1-sulphonic acid-4'-phenyl-phenyl ester. | 25.3 | 1-(3'-sulphophenyl)-3-methyl-5-amino-pyrazole. | Do. |
| 11 | 29.9 | 2-aminobenzene-1-sulphonic acid-β-naphthyl ester. | 25.3 | do | Do. |
| 12 | 33.8 | 2-aminobenzene-1-sulphonic acid-N-benzyl-N-phenylamide. | 25.3 | do | Do. |
| 13 | 32.45 | 2-amino-3'-chloracetyl-amino-1,1'-diphenyl-sulphone. | 28.75 | 1-(2'-chloro-5'-sulphophenyl)-3-methyl-5-amino-pyrazole. | Do. |
| 14 | 23.3 | 2-amino-1,1'-diphenylsulphone. | 28.75 | do | Do. |
| 15 | 35.45 | 2-amino-5-chloroacetylamino-benzene-1-sulphonic acid-(2'-methylphenylester). | 25.3 | 1-(3'-sulphophenyl)-3-methyl-5-amino-pyrazole. | Do. |
| 16 | 24.9 | 2-aminobenzene-1-sulphonic acid phenyl ester. | 25.3 | 1-(4'-sulphophenyl)-3-methyl-5-amino-pyrazole. | Do. |
| 17 | 28.35 | 2-aminobenzene-1-sulphonic acid-(2'-chlorophenylester.) | 25.3 25.3 | 1-(3'-sulphophenyl)-3-methyl-5-amino-pyrazole. | Do. |
| 18 | 36.1 | 2-aminobenzene-1-sulphonic acid 4'-octylphenyl ester. | 25.3 | do | Do. |
| 19 | 34.05 | 2-amino-5-chloroacetyl-amino-benzene-1-sulphonic acid-phenyl ester. | 25.3 | do | Do. |
| 20 | 34.05 | 2-aminobenzene-1-sulphonic acid 4'-chloracetylamino phenyl ester. | 28.75 | 1-(2'-chloro-5'-sulphophenyl)-3-methyl-5-amino-pyrazole. | Do. |
| 21 | 27.6 | 2-aminobenzene-1-sulphonic acid-N-ethyl-N-phenyl amide. | 28.75 | do | Do. |
| 22 | 29.9 | 2-aminobenzene-1-sulphonic acid-β-napthyl ester. | 28.75 | 1-(3'-chloro-6'-sulphophenyl)-3-methyl-5-amino-pyrazole. | Greenish yellow. |
| 23 | 31.2 | 2-aminobenzene-1-sulphonic acid-N-methyl-N,α-naphthylamide. | 28.75 | do | Do. |
| 24 | 28.3 | 2-amino-1-naphthyl-(2')-sulphonyl benzene. | 25.3 | 1-(3'-sulphophenyl)-3-methyl-5-amino-pyrazole. | Geenish yellow. |
| 25 | 28.3 | do | 28.75 | 1-(3'-chloro-6'-sulphophenyl)-3-methyl 5-amino-pyrazole. | Do. |
| 26 | 24.2 | 2-aminobenzene-1-sulphonic acid morpholide. | 28.75 | do | Do. |
| 27 | 24.0 | 2-aminobenzene-1-sulphonic acid piperidide. | 25.3 | 1-(3'-sulphophenyl)-3-methyl-5-amino pyrazole. | Greenish yellow |
| 28 | 17.1 | 2-amino-1-methyl-sulphonyl-benzene. | 25.3 | do | Do. |
| 29 | 18.5 | 2-amino-1-ethyl-sulphonyl-benzene. | 25.3 | do | Yellow. |
| 30 | 24.7 | 2-amino-1-benzyl sulphonyl benzene. | 25.3 | 1-(4'-sulphophenyl)-3-methyl-5-amino-pyrazole. | Do. |
| 31 | 24.7 | do | 28.75 | 1-(3'-chloro-6'-sulphophenyl)-3-methyl-5-amino-pyrazole. | Do. |
| 32 | 34.1 | 3-amino-1,1'-diphenyl-ether-4-sulphonicacid phenyl ester | 25.3 | 1-(3'-suphophenyl)-3-methyl-5-amino-pyrazole. | Greenish yellow. |
| 33 | 35.2 | 2-aminobenzene-1-sulphonic acid-N-dibenzylamide. | 25.3 | do | Do. |
| 34 | 33.8 | 4-aminobenzene-1-sulphonic acid-N-benzyl-N-phenyl amide. | 25.3 | do | Yellow. |
| 35 | 27.6 | 4-aminobenzene-1-sulphonic acid-N-ethyl-N-phenyl amide. | 25.3 | do | Greenish yellow. |
| 36 | 29.9 | 4-aminobenzene-1-sulphonic acid-β-naphthylester. | 25.3 | do | Do. |
| 37 | 24.7 | 4-amino-4'-methyl-1,1'-diphenyl sulphone. | 25.3 | do | Yellow. |
| 38 | 26.75 | 4-amino-4'-chloro-1,1'-diphenyl sulphone. | 25.3 | do | Do. |
| 39 | 31.9 | 4-aminobenzene-1-sulphonic acid-4'-amylphenyl ester. | 25.3 | do | Do. |
| 40 | 28.35 | 4-aminobenzene-1-sulphonic acid-(4'-chlorophenyl-ester). | 28.75 | 1-(2'-chloro-5'-sulphophenyl)-3-methyl-5-amino-pyrazole. | Do. |
| 41 | 28.35 | do | 25.3 | 1-(3'-sulphophenyl)-3-methyl-5-amino-pyrazole. | Do. |
| 42 | 31.9 | 4-aminobenzene-1-sulphonic acid-4'-amyl phenyl ester. | 25.3 | 1-(-4'-sulphophenyl)-3-methyl-5-amino-pyrazole. | Greenish yellow. |
| 43 | 35.2 | 4-aminobenzene-1-sulphonic acid-N,N-dibenzylamide. | 25.3 | 1-(3'-sulphophenyl)-3-methyl-5-amino-pyrazole. | Do. |
| 44 | 33.6 | 4-aminobenzene-1-sulphonic acid-N,N-dicyclohexylamide. | 25.3 | do | Do. |
| 45 | 24.0 | 4-aminobenzene-1-sulphonic acid piperidide | 25.3 | do | Do. |
| 46 | 24.2 | 4-aminobenzene-1-sulphonic acid morpholide. | 25.3 | do | Do. |
| 47 | 18.5 | 4-amino-1-ethyl-sulphonyl-benzene. | 32.2 | 1-(2',5'-dichloro-4'-sulphophenyl)-3-methyl-5-amino-pyrazole. | Yellow. |
| 48 | 19.9 | 4-amino-1-propyl-sulphonyl-benzene. | 32.2 | do | Do. |
| 49 | 26.3 | 4-aminobenzene-1-sulphonic acid-2'-methyl-phenylester. | 28.75 | 1-(2'-chloro-5'-sulphophenyl)-3-methyl-5-aminopyrazole. | Do. |
| 50 | 29.65 | 4-aminobenzene-1-sulphonic acid-N-methyl-N-4'-chloro-phenyl-amide. | 25.3 | 1-(2'-sulphophenyl)-3-methyl-5-aminopyrazole. | Do. |

TABLE—Continued

| No. | Parts | Diazo component | Parts | Azo component | Shade of wool dyeing |
|---|---|---|---|---|---|
| 51 | 35.6 | 4-aminobenzene-1-sulphonic acid-N-ethyl-N-phenyl-amide. | 25.3 | 1-(3'-sulpho-phenyl)-3-methyl-5-aminopyrazole. | Yellow. |
| 52 | 29.9 | 4-aminobenzene-1-sulphonic acid-β-naphthylester. | 28.75 | 1-(3'-chloro-6'-sulphophenyl)-3-methyl-5-aminopyrazole. | Greenish yellow. |
| 53 | 24.9 | 4-aminobenzene-1-sulphonic acid-phenyl-ester. | 28.75 | 1-(2'-chloro-5'-sulphophenyl)-3-methyl-5-aminopyrazole. | Yellow. |
| 54 | 34.05 | 4-aminobenzene-1-sulphonic acid-4'-chlor-acetyl-amino-phenylester. | 28.75 | ___do___ | Do. |
| 55 | 24.9 | 4-aminobenzene-1-sulphonic acid phenylester. | 25.3 | 1-(3'-sulpho-phenyl)-3-methyl-5-aminopyrazole. | Do. |
| 56 | 42.8 | 2-amino-1,1'-diphenyl-ether-5-sulphonic acid dicyclohexyl amide. | 25.3 | ___do___ | Do. |
| 57 | 34.1 | 2-amino-1,1'-diphenyl-ether-5-sulphonic acid phenylester. | 25.3 | ___do___ | Greenish yellow. |
| 58 | 24.7 | 4-amino-4'-methyl-1,1'-diphenyl-sulfone. | 28.75 | 1-(2'-chloro-5'-sulphophenyl)-3-methyl-5-aminopyrazole. | Yellow. |
| 59 | 26.75 | 4-amino-4'-chloro-1,1'-diphenyl-sulfone. | 28.75 | ___do___ | Do. |
| 60 | 26.75 | ___do___ | 32.2 | 1-(2',5'-dichloro-4'-sulphophenyl)-3-methyl-5-aminopyrazole. | Do. |
| 61 | 33.8 | 4-aminobenzene-1-sulphonic acid-N-phenyl-N-benzylamide. | 25.3 | 1-(2'-sulphophenyl)-3-methyl-5-amino-pyrazole. | Do. |
| 62 | 31.05 | 4-aminobenzene-1-sulphonic acid-N-ethyl-N-4'-chloro-phenylamide. | 25.3 | 1-(3'-sulphophenyl)-3-methyl-5-amino-pyrazole. | Do. |
| 63 | 33.6 | 4-aminobenzene-1-sulphonic acid-N,N-dicyclohexyl-amide. | 25.3 | ___do___ | Yellow. |
| 64 | 35.2 | 4-aminobenzene-1-sulphonic acid-N,N-dibenzylamide. | 25.3 | 1-(4'-sulphophenyl)-3-methyl-5-amino-pyrazole. | Do. |
| 65 | 34.05 | 4-aminobenzene-1-sulphonic acid-4'-chloro-acetylamino phenylester. | 25.3 | 1-(3'-sulphophenyl)-3-methyl-5-amino-pyrazole. | Do. |
| 66 | 17.1 | 4-amino-1-methyl-sulphonyl-benzene. | 25.3 | ___do___ | Do. |
| 67 | 24.7 | 4-amino-1'-benzylsulphonyl-benzene. | 25.3 | ___do___ | Do. |
| 68 | 24.7 | ___do___ | 25.3 | 1-(4'-sulphophenyl)-3-methyl-5-aminopyrazole. | Do. |
| 69 | 28.3 | 4-amino-1-[naphthyl-(2')-sulphonyl]-benzene. | 25.3 | ___do___ | Do. |
| 70 | 28.3 | ___do___ | 25.3 | 1-(3'-sulphophenyl)-3-methyl-5-aminopyrazole. | Yellow. |
| 71 | 37.8 | 4-aminobenzene-1-sulphonic acid-(4'-carbo-amyloxyamino-phenyl)-ester. | 25.3 | ___do___ | Do. |
| 72 | 32.5 | 4-aminobenzene-1-sulphonic acid-(4'-phenyl-phenyl)-ester. | 25.3 | ___do___ | Do. |
| 73 | 33.9 | 4-amino-benzene-1-sulphonic acid-N-benzyl-N-phenyl-amide. | 28.75 | 1-(3'-chloro-6'-sulphophenyl)-3-methyl-5-aminopyrazole. | Do. |
| 74 | 28.3 | 4-aminobenzene-1-sulphonic acid-2'-methyl-phenylester. | 28.75 | ___do___ | Do. |

What is claimed is:

1. A monoazo dyestuff of the formula

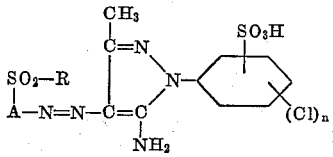

wherein

A is a member selected from the group consisting of phenyl, chloroacetylaminophenyl and phenoxyphenyl, each of which contains the —SO₂R group of the above formula in ortho-position to the azo-bridge, R is a member selected from the group consisting of lower alkyl, benzyl, at most bicyclic carbocyclic aryl, at most bicyclic carbocyclic aryloxy,

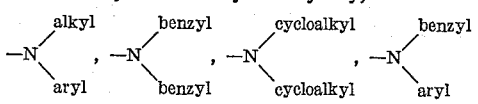

piperidino and morpholino, the aryl being carbocyclic and at most bicyclic, and $n$ is one of the numerals 0 to 2 inclusive.

2. A monoazo dyestuff of the formula

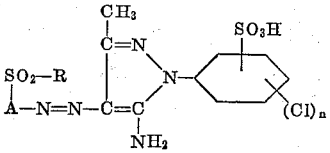

wherein A is a member selected from the group consisting of phenyl and phenoxyphenyl, each of which contains the —SO₂R group of the above formula in para-position to the azo bridge, R is a member selected from the group consisting of lower alkyl, benzyl, at most bicyclic carbocyclic aryl, at most bicyclic carbocyclic aryloxy,

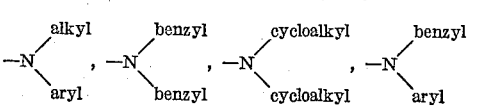

piperidino and morpholino, the aryl being carbocyclic and at most bicyclic, and $n$ is one of the numerals 0 to 2 inclusive.

3. The monoazo dyestuff of the formula

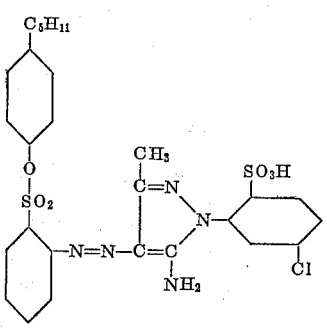

4. The monoazo dyestuff of the formula

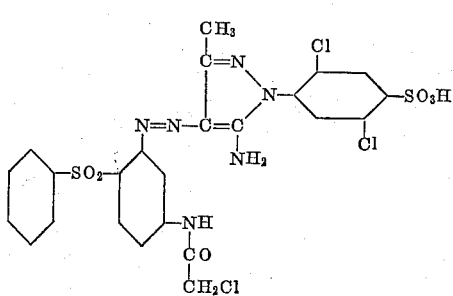

5. The monoazo dyestuff of the formula
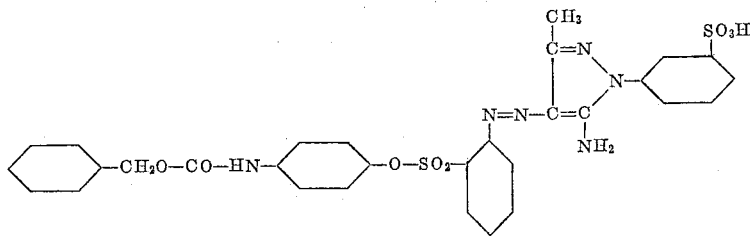
6. The monoazo dyestuff of the formula
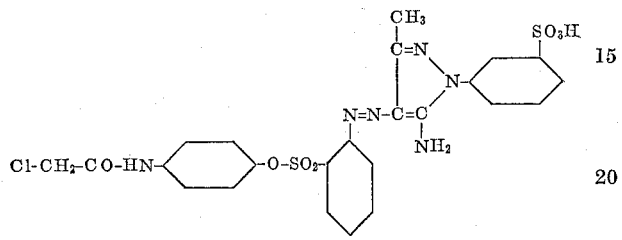
7. The monoazo dyestuff of the formula
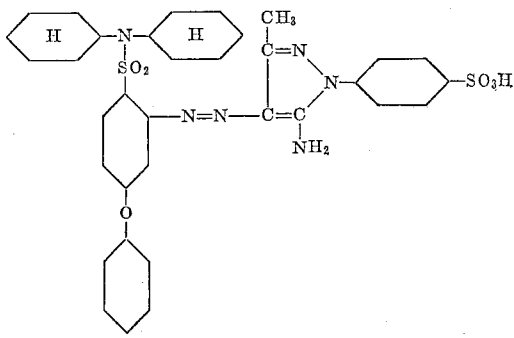
8. The monoazo dyestuff of the formula
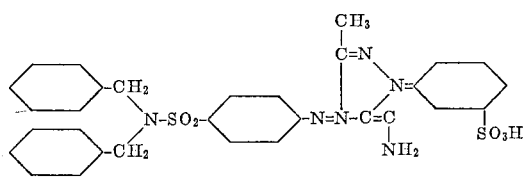
References Cited in the file of this patent
UNITED STATES PATENTS
| | | |
|---|---|---|
| 1,874,474 | Eichwede et al. | Aug. 30, 1932 |
| 1,876,884 | Eichwede et al. | Sept. 13, 1932 |
| 1,893,553 | Knecht et al. | Jan. 10, 1933 |
| 2,251,813 | West et al. | Aug. 5, 1941 |
| 2,728,762 | Heyna et al. | Dec. 27, 1955 |
FOREIGN PATENTS
| | | |
|---|---|---|
| 413,588 | Great Britain | July 19, 1934 |
| 138,873 | Switzerland | June 2, 1930 |